United States Patent [19]

Tapfer et al.

[11] Patent Number: 5,538,745
[45] Date of Patent: Jul. 23, 1996

[54] DAIRY CASE CONFECTION

[75] Inventors: Uwe Tapfer, Clarendon Hills; Malcolm Austin, Naperville, both of Ill.

[73] Assignee: Dove International - Division, Mars, Incorporates, Burr Ridge, Ill.

[21] Appl. No.: 393,350

[22] Filed: Feb. 21, 1995

Related U.S. Application Data

[63] Continuation-in-part of Ser. No. 204,875, Mar. 2, 1994, Pat. No. 5,482,728.
[51] Int. Cl.$^6$ ........................................................ A23G 9/00
[52] U.S. Cl. ............................ 426/101; 426/565; 426/99
[58] Field of Search ............................ 426/565, 566, 426/567, 100, 101, 99

[56] References Cited

U.S. PATENT DOCUMENTS

| | | | |
|---|---|---|---|
| 1,638,548 | 8/1927 | Nelson | 426/101 |
| 4,271,142 | 6/1981 | Puglia et al. | 424/14 |
| 4,397,881 | 8/1983 | Crothers | 426/565 |
| 4,698,232 | 10/1987 | Sheu et al. | 426/572 |
| 4,828,857 | 5/1989 | Sharma et al. | 426/99 |
| 5,238,696 | 8/1993 | Fuisz | 426/565 |
| 5,256,426 | 10/1993 | Tomioka et al. | 426/565 |
| 5,356,644 | 10/1994 | Hendrick et al. | 426/99 |

*Primary Examiner*—Jeanette Hunter
*Attorney, Agent, or Firm*—Lockwood, Alex, Fitzgibbon & Cummings

[57] ABSTRACT

A dairy case confection and a process of producing a frozen dairy case confection by mixing together a solid or semi-solid aerated composition comprising protein and ice crystals and particles having a hydrophilic core encapsulated in a hydrophobic coating at a temperature wherein there is substantially no melting of the ice crystals.

13 Claims, 3 Drawing Sheets

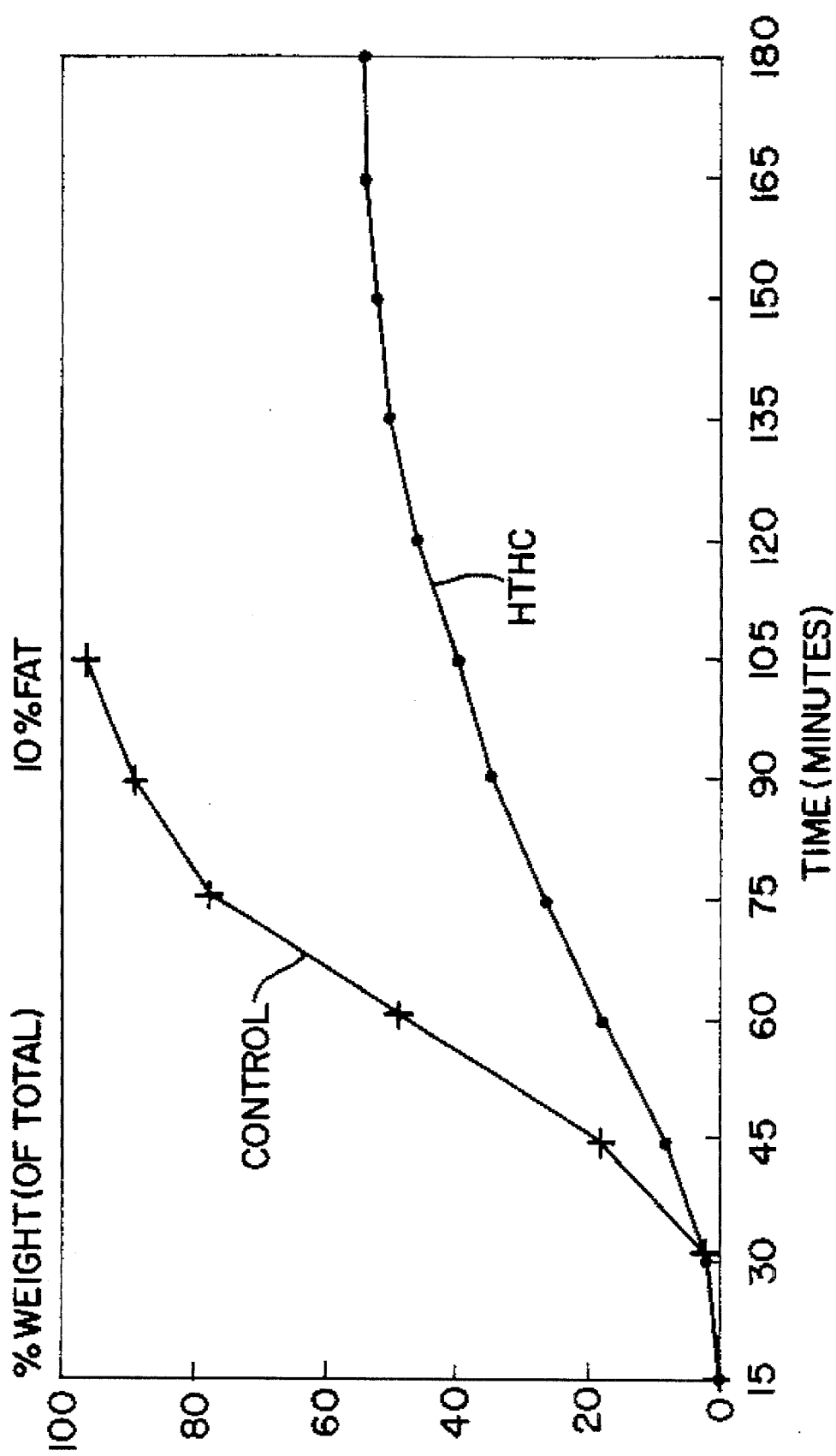

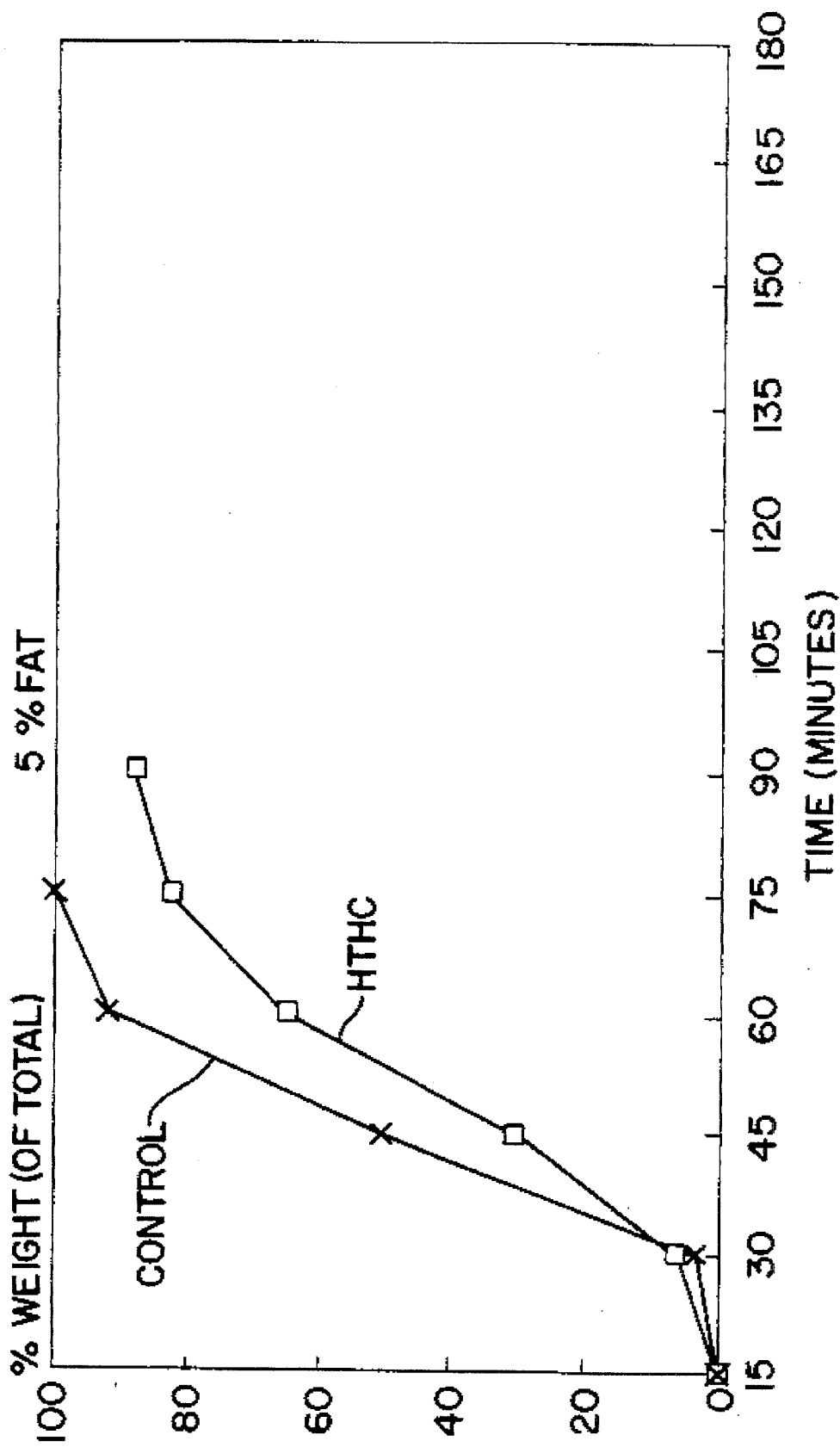

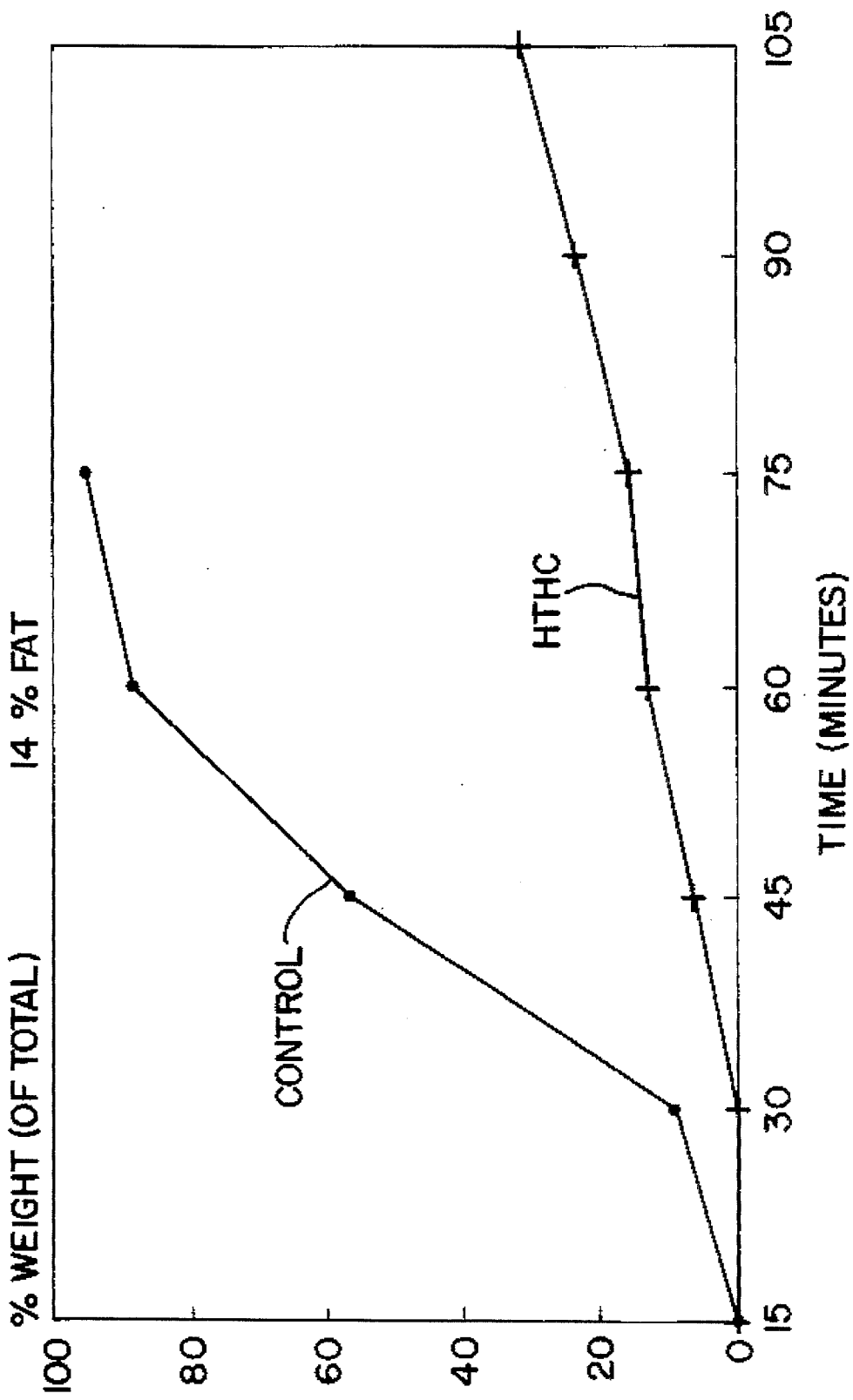

DAIRY CASE CONFECTION

This application is a continuation-in-part of application Ser. No. 08/204,875 filed Mar. 2, 1994, now U.S. Pat. No. 5,482,728.

This invention generally relates to dairy case confections and, more particularly to frozen dairy case confections which include a frozen composition containing particles having a hydrophilic solid core encapsulated in a hydrophobic coating and processes for making same. In this regard, an important aspect of this invention concerns frozen dairy confections comprising a blend of a frozen non-fat milk solids/water aerated mixture and sugar encapsulated in butterfat.

Ice cream's relatively poor freeze-thaw stability (relatively high melting point temperature) necessitates production, storage and transport at relatively low temperatures. Accordingly, there is a need for dairy case products, particularly ice cream products, that are more robust (i.e. melt at lower temperatures).

Ice cream's tendency to melt rapidly at ambient temperatures has led to the development of numerous frozen dairy products that can be handled at ambient temperatures such as chocolate coated ice cream bars, ice cream cones, etc. However, there is always a need for new forms of frozen dairy products particularly those that can be handled without rapid melting at room temperature.

Frozen dairy case confections, such as ice cream, are typically manufactured by thoroughly mixing whole milk (or butterfat, milk powder and water) sugar, foam stabilizer and emulsifier together with air and then freezing the mix at about minus 20° C. to get a solid or semi-solid. Attempts to carry out this process by omitting various components indicates that the sugar acts not only as a sweetener but also as a freeze-point depressant for the water in the ice cream and that elimination of the sugar permits manipulating the ingredients at a higher temperature, etc. Of course, ice cream isn't ice cream without a sweetener. Accordingly, there is a need for new processes for making ice cream.

As indicated above, ice creams typically contain foam stabilizer and emulsifier. Unfortunately, the typical foam stabilizer (pectins, gums, alginates, etc.) and emulsifier can give the ice cream an off taste. Accordingly, it is also desirable to provide processes for making ice cream that do not require foam stabilizer or emulsifier.

A substantial part of ice cream's appeal is due to the cold sensation provided on melting in the mouth. On melting 560 calories of heat are removed from the mouth per gram of ice cream. This mouth appeal is greatest for products having the sharpest melting peak. Accordingly, it is desirable to provide ice creams having a narrow melting range.

DESCRIPTION OF THE DRAWINGS

FIGS. 1 to 3 illustrate the percent by weight melt of various ice creams as a function of time at 21° C.±1° C.

The general object of this invention is to provide new frozen dairy case products and new processes of producing frozen dairy products. A more specific object of this invention is to provide new ice cream products and new processes of producing ice cream. Other objects appear hereinafter.

In one aspect, this invention is a frozen dairy case confection comprising a frozen composition containing particles having a hydrophilic solid core encapsulated in a hydrophobic coating and preferably an aerated proteinaceous phase containing ice crystals.

In a second aspect, this invention is a frozen dairy case confection comprising a frozen composition containing compressed together particles having a hydrophilic solid core encapsulated in a hydrophobic coating and particles comprising a major portion of ice crystals and a minor portion of protein.

In a third aspect this invention is a process of producing a frozen dairy case confection comprising mixing together a solid or semi-solid composition comprising milk protein and ice crystals and particles having a hydrophilic solid core encapsulated in a hydrophobic coating at a temperature wherein there is substantially no melting of the ice crystals.

In another aspect this invention is a process of forming a frozen dairy case confection comprising compressing together particles comprising ice crystals and protein and particles comprising a hydrophilic solid core encapsulated in a hydrophobic coating at a temperature below the melting point of the ice crystals.

The general object of this invention can be attained by mixing together a solid or semi-solid aerated composition comprising protein and ice crystals and particles having a hydrophilic solid core encapsulated in a hydrophobic coating. Surprisingly we have found that by encapsulating the hydrophilic solid core, such as a sweetener, in a hydrophobic coating, preferably butterfat in the case of ice cream, it is possible to carry out the preparation of the ice cream at a higher temperature, e.g. about −1° to −2° C. (a temperature at which $H_2O$ is in the form of ice crystals) without having the hydrophilic coated material exert a freeze point depressant effect upon the finished frozen dairy confection. For best results, the majority of the water is in the form of ice crystals.

The product is more robust (i.e. melt at higher temperature than products produced using uncoated sweeteners) and can be shipped at warmer temperatures without thawing. There is less of a tendency for the product to melt during handling by the consumer. Ice cream produced in this manner has a sharper melting range than ice cream produced using uncoated sweeteners and other things being equal provides greater mouth appeal. As explained below, this process allows the production of new products never seen before and permits the elimination of emulsifiers and foam stabilizers.

The robustness of the products of this invention is demonstrated in the examples using a standard industry melting test for ice cream size bars containing nominal butterfat levels of 5% by weight (ice milk), 10% by weight (standard) and 14% by weight (premium). The test is not suitable for ice cream size bars containing nominally 18% by weight butterfat (super premium) because the melted composition has the fatty sponge matrix texture of butter and does not flow freely. However, to the best of our knowledge, the so-called super premium ice creams have not been marketed for the last 10 or 20 years.

Briefly the products of this invention can be formed by blending together a solid or semi-solid composition comprising a proteinaceous material and ice crystals and particles having a hydrophilic solid core encapsulated in a hydrophobic coating.

The hydrophilic core of the particles comprising a hydrophilic solid core encapsulated in an oleophilic or hydrophobic coating can comprise one or more sweeteners, such as sucrose, dextrose, fructose, dried corn syrup, lactose, saccharin etc.; non-caloric materials such as calcium carbonate, kaolin etc.; medicaments; etc. The hydrophilic core has a particle size up to 2000 micron, preferably less than 100 microns most preferably less than 30 micron. In order to give the frozen confections a smooth texture in the mouth rather than a grainy, sandy texture, it is preferred that all particulates have a particle size less than 30 micron.

The hydrophobic coating material can comprise any food acceptable fat or oil, such as butterfat, corn oil, soy bean oil, rapeseed oil, safflower oil, etc. Butterfat is preferred for ice cream like products. The oleophilic or hydrophobic coating material can be used in a concentration sufficient to encapsulate or enrobe the hydrophilic core and can range from about 5 to 125 parts by weight dry solids basis per 100 part by weight dry solids basis of the hydrophilic core material dependent on the particle size of the hydrophilic core. The smaller the hydrophilic core the higher the concentration of coating material. However, the preferred range is suitable for ice milk, standard and premium ice cream. If desired, part of the hydrophobic material can be used to enrobe the hydrophilic core and part of the hydrophobic material can be added to the aqueous materials but the total hydrophobic coating material should be in the aforesaid range. The oleophilic coating can be applied in any convenient manner.

The aqueous proteinaceous or frozen portion of the confection can be formed from milk protein (casein or sodium caseinate) such as skim milk, whole milk, spray dried skim milk; yogurt; soy bean protein etc. The proteinaceous material must be water soluble or water dispersible. In the latter case, the proteinaceous material can be composed of particles having a size up to about 2000 microns, preferably less than 100 microns and most preferably less than about 30 microns. The proteinaceous portion of the confection can range from about 5 to 50% parts by weight of the confection.

Various foam stabilizers, such as pectin, gum, alginates and emulsifiers such as mono and diglycerides can be used, but are preferably omitted.

Chemical compounds and so-called clathrate caged ice crystals can be used to provide improved taste or cooling sensation or heat tolerance. Suitable chemical compounds include N-ethyl-p-menthane-3 carboxamide, N,2,3-trimethyl-2-isopropyl-butanamide, etc. These chemical compounds can be added to ice cream in a concentration of about 0.001 to 10 ppm. The caged clathrate crystals can be formed by adding $CO_2$, $N_2$, $N_2O$ or mixtures thereof to the aqueous protein and can comprise up to about 100% by volume of the gases used to aerate the confection.

In somewhat greater detail, the products of this invention can be prepared by producing separately an aqueous, aerated foamed proteinaceous component containing water in the form of ice crystals and blending same with particles having a hydrophilic solid core encapsulated in a hydrophobic coating.

The aqueous aerated, foamed proteinaceous component can be prepared by dissolving or dispersing the proteinaceous material in water. After mixing (with or without additional hydrophobic material), the composition is then aerated with air, and foamed to form a stable proteinaceous material at a temperature sufficient to convert the $H_2O$ into ice crystals and produce a paste-like consistency. This can be done by using a scraped surface heat exchanger such as a single screw extruder at a temperature of about $-2°$ to $-4°$ C. If liquid $H_2O$ is present, there may be some freeze-point depression on contact with the encapsulated hydrophilic material.

If the product is produced at a lower temperature such as about minus 20° C. the resulting product is a solid which can advantageously be ground at about minus 20° C. in a pin mill to a free-flowing particulate solid like product. Generally, the sizes of the particulate encapsulated hydrophilic solid and particulate aerated foamed proteinaceous material should be about the same size.

The hydrophilic core material is generally ground to a particle size of less than about 30 microns, preferably in the range of about 1 to 30 microns before blending with the hydrophobic coating. The hydrophilic core material is cooled to about 0° to minus 10° C. and blended with the oleophilic material to enrobe or encapsulate the hydrophilic material in the hydrophobic material. The encapsulated material is preferably cold milled to no more than 30 microns to provide the desired texture in the final product.

The aerated, foamed proteinaceous component is then blended with the encapsulated hydrophilic material at a temperature wherein there is substantially no melting of the ice crystals. In those cases where the aerated foam stable proteinaceous material has a paste-like consistency it can be blended with the encapsulated hydrophilic material in an isothermal mixer, such as a screw extruder and cut into pieces.

In those cases when the aerated, foamed proteinaceous component is a free flowing solid it can be compression molded with the encapsulated hydrophilic material to form bars, lentils, etc. as indicated above, both types of particles are preferably about the same size. These shaped objects can be coated with an edible shell, such as a sugar shell like a gum ball or chocolate shell with an outer sugar shell. By suitable choice of fat, sweetener and proteinaceous material it is now possible to produce ice cream lentils or balls which can be handled at room temperature without rapid melting.

The techniques described herein can be used to produce frozen dairy products such as ice cream, soft ice cream, iced milk, frozen yogurt, sherbet, etc. and special diet deserts. For example, the caloric sweetener can be replaced with saccharin, calcium carbonate, etc. Butterfat can be replaced with polyunsaturated glyceride oils such as corn oil, soybean oil, safflower oil, peanut oil etc.

More specifically, the process of this invention can be used to prepare commercial ice cream and related products described in "Ice cream" by W. S. Arbuckel published by AVI (1986) in Table 4.1 at page 29.

TABLE 4.1

Approximate Composition (%) of Commercial Ice Cream and Related Products

| Product | Milkfat | MSNF | Sugar | Stabilizers & Emulsifier | Approximate TS |
|---|---|---|---|---|---|
| Economy Ice Cream | 10.0 | 10.0–11.0 | 15.0 | 0.30 | 35.0–37.0 |
|  | 12.0 | 9.0–10.0 | 13.0–16.0 | 0.20–0.40 |  |
| Trade brand Ice | 12.0 | 11.0 | 15.0 | 0.30 | 37.5–39.0 |
| Cream | 14.0 | 8.0–9.0 | 13.0–16.0 | 0.20–0.40 |  |

TABLE 4.1-continued

Approximate Composition (%) of Commercial Ice Cream and Related Products

| Product | Milkfat | MSNF | Sugar | Stabilizers & Emulsifier | Approximate TS |
|---|---|---|---|---|---|
| Deluxe ice cream (premium-super premium) | 16.0 | 7.0–8.0 | 13.0–16.0 | 0.20–0.40 | 40.0–41.0 |
|  | 18.0–20.0 | 6.0–7.5 | 16.0–17.0 | 0.0–0.20 | 42.0–45.0 |
|  | 20.0 | 5.0–6.0 | 14.0–17.0 | 0.25 | 46.0 |
| Ice milk | 3.0 | 14.0 | 14.0 | 0.40 | 31.4 |
|  | 4.0 | 12.0 | 13.5 | 0.40 |  |
|  | 5.0 | 11.5 | 13.0 | 0.40 | 29.0–30.0 |
|  | 6.0 | 11.5 | 13.0 | 0.35 |  |
| Sherbet | 1.0–3.0 | 1.0–3.0 | 26.0–35.0 | 0.40–0.50 | 28.0–36.0 |
| Mellorine | 6.0–10.0 (vegetable fat) | 2.7 (Protein) | 14.0–17.0 | 0.40 | 36–38 |
| Frozen yogurt | 3.25–6.0 | 8.25–13.0 | 15.0–17.0 | 0.50 | 30.0–33.0 |
|  | 0.5–2.0 | 8.25–13.0 | 15.0–17.0 | 0.60 | 29.0–32.0 |
|  | <0.5 | 8.25–14.0 | 15.0–17.0 | 0.60 | 28.0–31.0 |
| Dietary frozen dessert | <2 | Not less than 7% TMS | 11.0–13.0 | 0.50 | 18.0–20.0 |

In the above Table, "MSNF" stands for milk solids non-fat, "TS" stands for total solids and "TMS" stands for total milk solids. These recipes can be modified consistent with this invention. For example, stabilizer and emulsifiers can be omitted.

In the examples that follow reference is made to the term overrun e.g. 100% overrun. The term "overrun" is a measurement of the amount of air used to aerate the composition. One hundred percent overrun means that there is an equal volume of air to the other components of the product.

EXAMPLE 1

Frozen fat/free milk solids mixture was formed by mixing together 12.89 kg. condensed skim milk (32.35% by weight dry solids), 66.82 g Continental Colloids 305 stabilizer (locust bean gum, guar gum, carrageenan, standardized with sucrose), 2.27 g Continental Colloids 415 carrageenan, 62.73 g of Continental Colloids 200 emulsifier (mono and diglycerides) and 15.57 g tap water in a stainless steel container for 1 minute using a Scott Turbon High Speed Agitator at medium speed. The mix was run through a pasteurizer (APV Pilot Scale HTST, 115 L/hr. capacity) for a residence time of 25 seconds at 85° C. The mix was also homogenized (APV Pilot Scale 2 Stage Homogenizer, 115 L/hr. capacity) at 103 bar in the first stage and 35 bar in the second stage and stored in a refrigerator at +4° C. overnight. The mixture was then frozen in a Taylor Batch Ice Cream Freezer (Model 33) at 100% discharge temperature of −2.5° C.

Fat encapsulated sweetener was produced by mixing 98.24 g of anhydrous milkfat, 138.06 g of sucrose and 29.21 g of 42 D.E. corn syrup powder in a Hobart Planetary Dough Mixer for 2–3 minutes. The fat encapsulated sweetener was placed on trays, frozen to −20° C. and broken into granules. The granules were cold milled at −15° C. in a Stefan High Speed Mixer to a particle size of around 30 microns and stored in a −10° C. freezer.

An ice cream (37.97% by weight dry solids) of this invention (HTHC) containing 9.98% by weight milkfat (wet solids), 10.65% by weight condensed skim milk (wet solids), 17% by weight sweetener (wet solids) and 0.34% by weight total stabilizer and emulsifier was prepared by mixing 265.91 g encapsulated sweetener of the preceding paragraph and 718.18 g of the frozen fat free solids composition of paragraph one in a one gallon plastic container located in an ice jacketed stainless steel bucket for one minute under moderate agitation using a Scott Turbon Mixer. The resulting ice cream has a final overrun of 50% and was placed in a −26° C. walk-in freezer and hardened for 24 hours before evaluation.

A conventional ice cream (Standard) of the same composition (about 37.97% by weight wet solids) except that it did not contain fat encapsulated sweetener was also stored in a −26° C. freezer for 24 hours.

Samples of the (A) ice cream of this invention (HTHC) and (B) conventional ice cream (Standard) were immediately formed into ice cream size bar shapes in a mold, with each bar weighing about 70 grams. The molds were placed in a −26° C. walk-in freezer overnight. Each bar, at about −26° C., was placed on a U.S.A. Tyler No. 7 sieve in a room at 21° C.±1° C. and allowed to melt. The melted product was funnelled to an analytical balance and readings taken every 15 minutes. The results which are shown in Graph 1 clearly show that the ice cream confections of this invention are much more robust than conventional ice cream confections.

TABLE 1

Trade Brand (10% Fat)

| Constituent | Weight Composition (%) |
|---|---|
| a. Wet Solids Basis | |
| Milkfat | 9.98 |
| MSNF | 10.65 |
| Sweetener (sucrose & corn syrup) | 17.00 |
| Stabilizers & Emulsifiers | .34 |
| Total Solids | 37.97 |
| Water | 62.03 |
| b. Dry Solids Basis | |
| Milkfat | 26.28 |
| MSNF | 28.05 |
| Sweetener (sucrose & corn syrup) | 44.77 |
| Stabilizers & Emulsifiers | .90 |

EXAMPLE 2

Frozen fat free milk solids mixture was formed by mixing together 10.25 kg condensed skim milk (32.35% by weight dry solids), 46.26 g stabilizer (Continental Colloids 305, locust bean gum, guar gum, carrageenan, standardized with sucrose), 1.63 g (Continental Colloids 415, carrageenan), 43.54 g of emulsifier (Continental Colloids 200, mono and diglycerides) and 11.97 g tap water in a stainless steel container for 1 minute using a Scott Turbon High Speed Agitator at medium speed. The mix was run through a pasteurizer (APV Pilot Scale HTST, 115 L/hr. capacity) for a residence time of 25 seconds at 85° C. The mix was also homogenized (APV Pilot Scale 2 Stage Homogenizer, 115 L/hr. capacity) at 103 bar in the first stage and 35 bar in the second stage and stored in a refrigerator at 4° C. overnight. The mixture was then frozen in a Taylor Batch Ice Cream Freezer (Model 33) at 100% overrun and a discharge temperature of −2.5° C.

Fat encapsulated sweetener was produced by mixing 630.2 g of anhydrous milkfat, 1.34 kg of sucrose and 293.7 g of 42 D.E. corn syrup powder in a Hobart Planetary Dough Mixer for 2–3 minutes. The fat encapsulated sweetener was placed on trays, frozen to −20° C. and broken into granules. The granules were cold milled at about −15° C. in a Stefan High Speed Mixer to a particle size of around 30 microns and stored in a −10° C. freezer.

An ice milk (30.52% by weight wet solids) of this invention containing 5.0% by weight milkfat (dry solids), 12.19% by weight condensed skim milk (wet solids 12.99% by weight sweetener (wet solids) and 0.34% by weight total stabilizer and emulsifier was prepared by mixing 219.4 g encapsulated sweetener of the preceding paragraph and 1.0 kg of the frozen fat free solids composition of paragraph one in a one gallon plastic container located in an ice jacketed stainless steel bucket for one minute under moderate agitation using a Scott Turbon Mixer. The resulting ice cream has a final overrun of 50% (half of the overrun was lost due to mixing) and was placed in a −26° C. walk-in freezer and hardened for 24 hours before evaluation.

A conventional ice milk of the same composition (about 30.5% by weight wet solids) except that it did not contain fat encapsulated sweetener was also stored in a −26° C. freezer for 24 hours.

Samples of the ice milk of this invention, conventional ice milk and mixture frozen fat free milk solids of paragraph one and encapsulated sweetener (2.6:1, sugar-fat ratio) was immediately formed into ice cream size bar shapes in a mold, with each bar weighing about 70 grams. The molds were placed in a −26° C. walk-in freezer overnight. Each bar at about −26° C. was placed on a U.S.A. Tyler No. 7 sieve in a room at 21° C.±1° C. and allowed to melt. The melted product was funnelled to an analytical balance and readings taken every 15 minutes. The results which are shown in Graph 2 clearly show that the ice milk confections of this invention are much more robust than conventional ice milk confections.

TABLE 2

| Recipe Composition Ice Milk (5% Fat) | |
|---|---|
| Constituent | Weight Composition (%) |
| a. Wet Solids Basis | |
| Milkfat | 5.00 |
| MSNF | 12.19 |
| Sweetener | 12.99 |
| (sucrose & corn syrup) | |
| Stabilizers & Emulsifiers | .34 |

TABLE 2-continued

| Recipe Composition Ice Milk (5% Fat) | |
|---|---|
| Constituent | Weight Composition (%) |
| Total Solids | 30.52 |
| Water | 69.48 |
| b. Dry Solids Basis | |
| Milkfat | 16.38 |
| MSNF | 39.94 |
| Sweetener | 42.56 |
| (sucrose & corn syrup) | |
| Stabilizers & Emulsifier | 1.11 |

EXAMPLE 3

Frozen low fat/sugar milk solids mixture was formed by mixing together 16.63 kg condensed skim milk (30.07% by weight dry solids), 72.56 g stabilizer (Continental Colloids 305, locust bean gum, guar gum, carrageenan, standardized with sucrose), 2.72 g (Continental Colloids 415, carrageenan), 68.03 g of emulsifier (Continental Colloids 200, mono and diglycerides), 1.81 kg AMF (Anhydrous Milkfat) and 14.79 kg tap water in a stainless steel container for 1 minute using a Scott Turbon High Speed Agitator at medium speed. The mix was run through a pasteurizer (APV Pilot Scale HTST, 115 L/hr. capacity) for a residence time of 25 seconds at 85° C. The mix was also homogenized (APV Pilot Scale 2 Stage Homogenizer, 115 L/hr. capacity) at 103 bar in the first stage and 35 bar in the second stage and stored in a refrigerator at 4° C. overnight. The mixture was then frozen in a Taylor Batch Ice Cream Freezer (Model 33) at 100% overrun and a discharge temperature of −2.3° C.

Fat encapsulated sweetener was produced by mixing 121.33 g of anhydrous milkfat, 145.45 g of sucrose and 53.39 g of 42 D.E. corn syrup powder in a Hobart Planetary Dough Mixer for 2–3 minutes. The fat encapsulated sweetener was placed on trays, frozen to −20° C. and broken into granules. The granules were cold milled at about −15° C. in a Stefan High Speed Mixer to a particle size of around 30 microns and stored in a −10° C. freezer.

An ice cream (41.72% by weight total solids) of this invention containing 14% by weight milkfat (wet solids), 27.09% by weight condensed skim milk (8.37% dry solids) 18.48% by weight sweetener (wet solids) and 0.29% by weight total stabilizer and emulsifier was prepared by mixing 320.32 g encapsulated sweetener of the preceding paragraph and 1232 g of the frozen low fat solids composition of paragraph one in a one gallon plastic container located in an ice jacketed stainless steel bucket for one minute under moderate agitation using a Scott Turbon Mixer. The resulting ice cream has a final overrun of 50% (half of the overrun was lost due to mixing) and was placed in a −26° C. walk-in freezer and hardened for 24 hours before evaluation.

A conventional ice cream of the same composition (about 41.72% by weight total solids) except that it did not contain fat encapsulated sweetener was also stored in a −26° C. freezer for 24 hours.

Samples of the ice cream of this invention, conventional ice cream and mixture frozen low fat solids of paragraph one and encapsulated sweetener (1.7:1, sugar-fat ratio) was immediately formed into ice cream size bar shapes in a mold, with each bar weighing about 70 grams. The molds were placed in a −26° C. walk-in freezer overnight. Each bar at about −26° C. was placed on a U.S.A. Tyler No. 7 sieve in a room at 21°±1° C. and allowed to melt. The melted product was funnelled to an analytical balance and readings taken every 15 minutes. The results are depicted in Graph 3.

TABLE 3

Recipe Composition Premium (14% Fat)

| Constituent | Weight Composition (%) |
|---|---|
| a. Wet Solids Basis | |
| Milkfat | 14.00 |
| MSNF | 10.00 |
| Sweetener | 18.48 |
| (sucrose & corn syrup) | |
| Stabilizers & Emulsifiers | 0.29 |
| Total Solids | 41.72 |
| Water | 58.28 |
| b. Dry Solids Basis | |
| Milkfat | 33.56 |
| MSNF | 23.97 |
| Sweetener | 44.30 |
| (sucrose & corn syrup) | |
| Stabilizers & Emulsifier | 0.70 |

We claim:

1. A robust frozen dairy case confection comprising particles having a hydrophilic solid core encapsulated in a hydrophobic coating in a weight ratio of from 5 to 125 parts by weight hydrophobic coating per 100 parts by weight hydrophilic core and a proteinaceous phase containing ice crystals.

2. The frozen dairy case confection of claim 1, wherein said proteinaceous phase containing ice crystals is aerated.

3. The frozen dairy case confection of claim 2, wherein the proteinaceous phase is aerated and said hydrophilic solid core comprises a sweetener.

4. The frozen dairy case confection of claim 3, wherein the sweetener core encapsulated in a hydrophobic coating has a particle size less than 100 microns.

5. The frozen dairy case confection of claim 4, wherein the hydrophobic coating is present in a concentration 30 to 100 parts by weight dry solids basis per 100 parts by weight sweetener dry solids basis.

6. A robust frozen dairy case confection comprising compressed together particles having a hydrophilic solid core encapsulated in a hydrophobic coating in a weight ratio of from 5 to 125 parts by weight of hydrophobic coating per 100 parts by weight hydrophilic core and particles comprising a major portion of ice crystals and a minor portion of protein.

7. The frozen dairy case confection of claim 4, wherein the hydrophilic solid core comprises a sweetener.

8. The frozen dairy case confection of claim 6, wherein said dairy confection is in an edible shell.

9. The frozen dairy case confection of claim 7, wherein said dairy confection is in a sugar shell and contains a layer of chocolate between the sugar shell and compressed together particles.

10. A process of producing a frozen dairy confection comprising the steps of (1) forming a solid or semi-solid composition comprising protein and ice crystals, (2) aerating the composition of step (1), (3) forming particles having a hydrophilic solid core of up to 100 microns encapsulated in a hydrophobic coating and (4) blending the compositions of steps (2) and (3) at a temperature wherein there is substantially no melting of the ice crystals.

11. The process of claim 9 wherein the particles having a hydrophilic core comprise a sweetener.

12. A process of forming a frozen dairy confection comprising the steps of (1) forming a solid or semi-solid composition comprising ice crystals and protein, (2) aerating the composition of step, (1), (3) grinding the composition of step (2) at a temperature sufficient to produce a free-flowing particulate solid like product, (4) forming particles comprising a hydrophilic solid core of up to 100 microns encapsulated in a hydrophobic coating and (5) compressing together the particles or particulates produced in steps (3) and (4) at a temperature below the melting point of the ice crystals.

13. The process of claim 10, wherein the particles comprising a hydrophilic solid core comprise a sweetener and said hydrophilic solid core encapsulated in a hydrophobic coating have a particle size less than 100 microns.

* * * * *